March 16, 1926. 1,576,904
W. J. FRANCIS
COTTON HARVESTER
Filed May 15, 1924 2 Sheets-Sheet 1
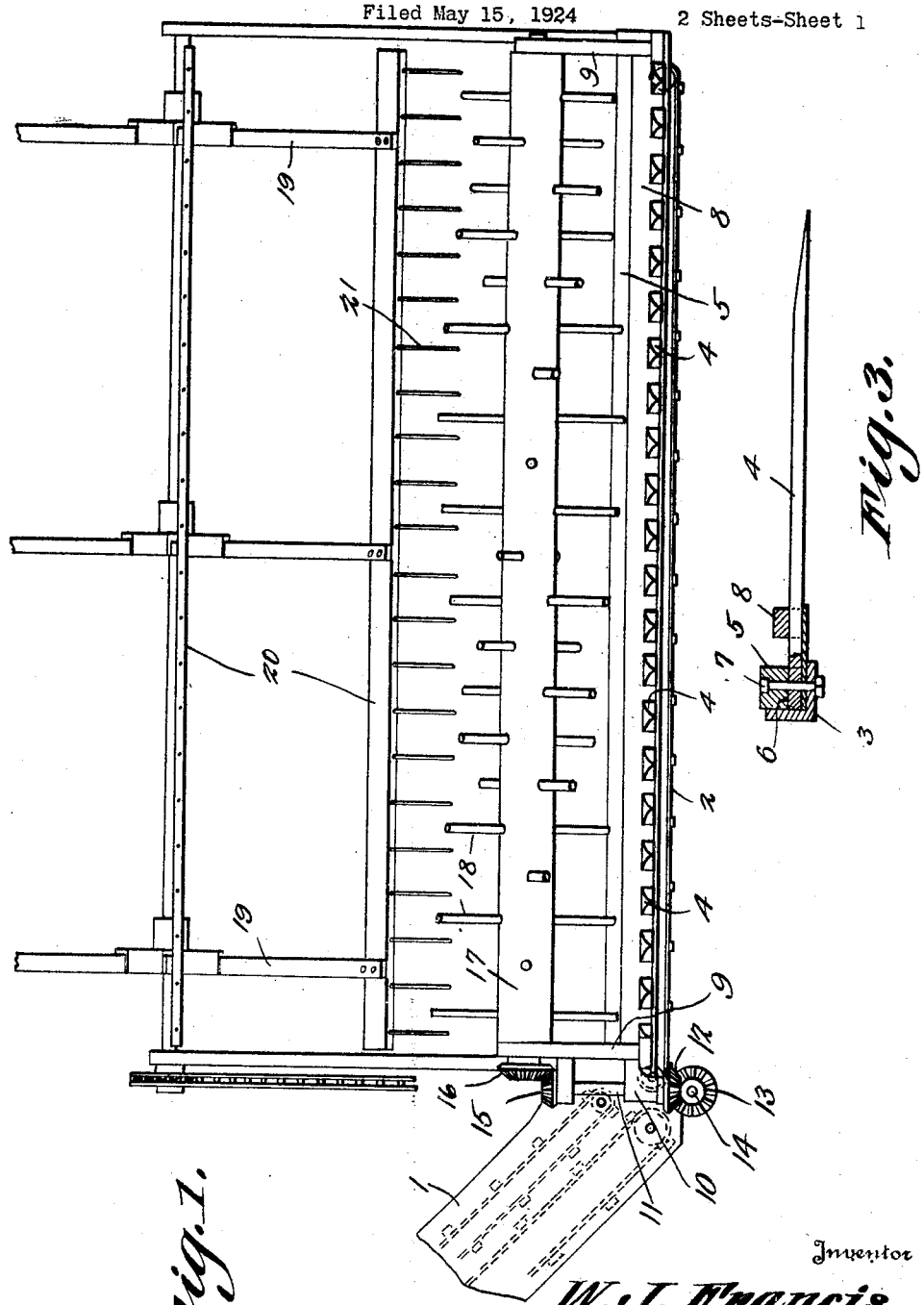
Inventor
W. J. Francis
By C.A.Snow&Co.
Attorneys March 16, 1926.
W. J. FRANCIS
1,576,904
COTTON HARVESTER
Filed May 15, 1924        2 Sheets-Sheet 2
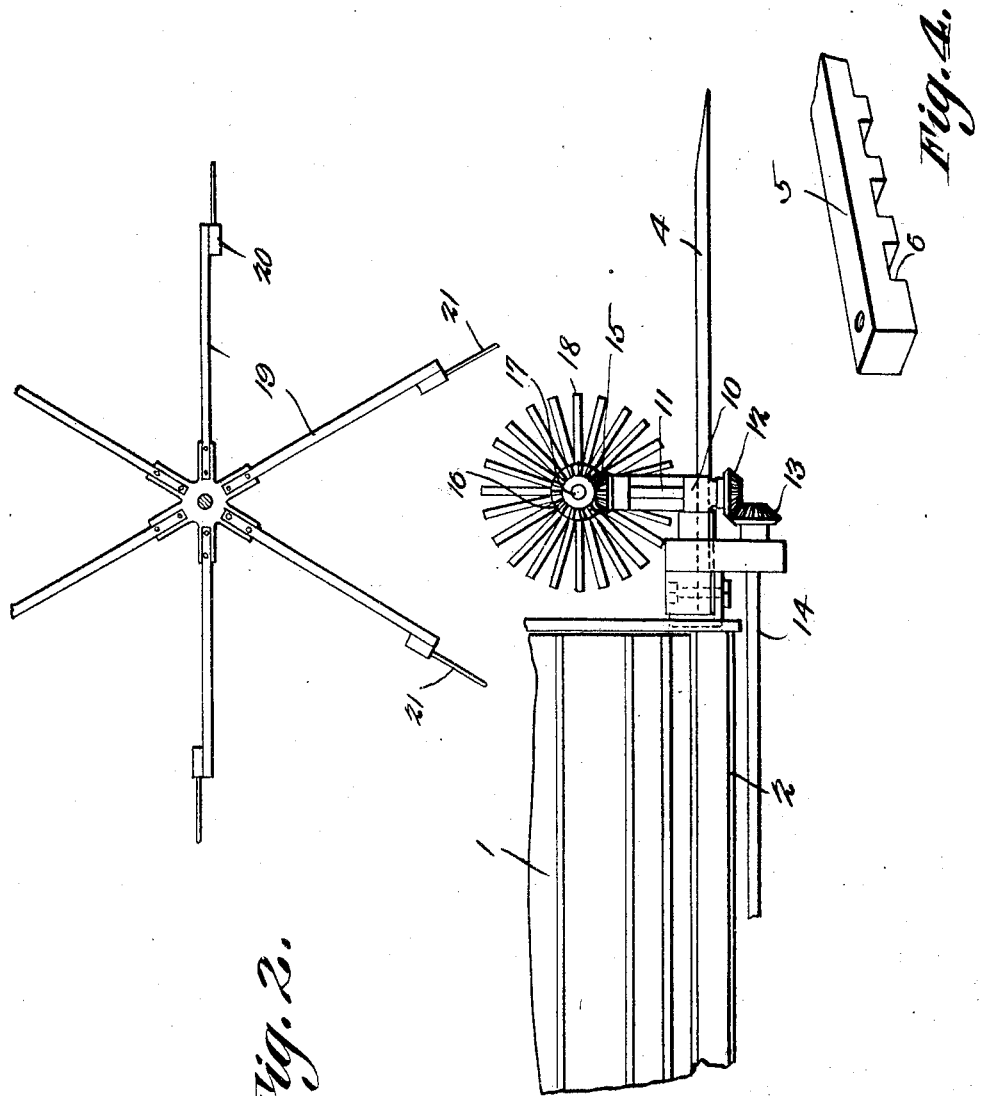

Patented Mar. 16, 1926.

1,576,904

UNITED STATES PATENT OFFICE.

WILLIAM J. FRANCIS, OF TEXICO, NEW MEXICO.

COTTON HARVESTER.

Application filed May 15, 1924. Serial No. 713,542.

*To all whom it may concern:*

Be it known that I, WILLIAM J. FRANCIS, a citizen of the United States, residing at Texico, in the county of Curry and State of New Mexico, have invented a new and useful Cotton Harvester, of which the following is a specification.

This invention relates to a cotton harvester and is more especially an attachment for use in connection with headers and like agricultural machines.

In some localites such as western Texas and New Mexico the cotton growing season is very short and usually, before the cotton has been harvested, the weather becomes so cold that it is difficult to secure the help necessary to pick the cotton.

It is an object of the present invention to provide an attachment which will comb through the standing plants, there being means cooperating with the combing fingers for taking the bolls off of the plants and directing them onto a conveyor.

A further object is to provide an attachment of this character which is simple and durable in construction and can be applied readily to machines already in use as headers and the like.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a front elevation of the attachment, a portion of the header or harvester to which it is applied being also shown.

Fig. 2 is a side elevation of the parts illustrated in Fig. 1.

Fig. 3 is a section through the mounting of the gathering fingers.

Fig. 4 is a detail view of a portion of a notched bar.

Referring to the figures by characters of reference 1 designates a portion of the conveying mechanism of a grain header or harvester, this elevating or conveying mechanism being located at one end of a conveyor belt 2 located back of the sickle bar. In the present instance the attachment is to be substituted for the sickle bar, in part, there being an angle beam 3 for attachment in front of the belt 2, this beam supporting a longitudinal series of forwardly extending combing or gathering fingers or tines 4. The rear or base ends of these tines are held to the beam 3 by a bar 5, the bottom face of which is notched, as at 6, to receive the tines. Bolts 7 are extended through the bar 5 and the beam 3. A brace bar 8 is mounted on and straddles the tines at a short distance in front of the bar 5.

Standards 9 are mounted on the end portions of the beam 3 and bearings 10 are extended laterally from one of these standards. In these bearings is journaled a shaft 11 having a gear 12 at its lower end meshing with a gear 13 secured to the drive shaft of the harvester or header, this shaft being indicated at 14. The upper end of shaft 11 has a gear 15 meshing with another gear 16 secured to one end of a shaft 17. Spirally arranged fingers 18 are extended radially from the shaft 17.

The usual header reel has been indicated at 19 and is adapted to be operated in any preferred manner. In the present instance bars 20 are connected to the radial arms of the reel, each bar having a longitudinal series of fingers 21 extending therefrom so as to work between the paths of the fingers 18 on shaft 17.

The structure herein described is adapted to be used on a cotton field after the frost has set in and the plants have been killed. The attachment is applied to an ordinary header or binder and is propelled forwardly over the field. The tines 4 will comb through the plants and bring them to positions where the fingers 18 on the shaft 17 will engage the plants and tear the bolls therefrom. They will thus be conveyed upwardly into the paths of the fingers 21 which will knock the bolls off of the fingers 18 and throw them back onto the conveyor 2. This in turn will carry the bolls and other materials thereon to the elevating conveyor 1. The material thus handled can then be stacked and subsequently fed to a cotton cleaner which will separate the hulls and trash from the fibers of the cotton.

It has been found in practice that an attachment of this type is especially useful where the harvesting of plants during the cold season is necessary.

What is claimed is:—

A cotton harvesting attachment for headers and the like including a series of plant gathering tines, a shaft journaled thereabove, fingers radiating from the shaft for stripping bolls from the plants engaged by the tines, a reel mounted for rotating about an axis above the shaft and fingers projecting from the reel for engaging plants gathered by the tines, directing the plants against the stripping fingers, removing bolls from the stripping fingers and discharging the bolls rearwardly therefrom, and a transverse conveyor movably mounted back of the stripping fingers and beneath a portion of the reel for receiving the bolls from the reel.

In testimony that I claim the foregoing as my own, I have hereto affixed my signature.

WILLIAM J. FRANCIS.